United States Patent
Steinlage et al.

(10) Patent No.: US 10,401,249 B2
(45) Date of Patent: Sep. 3, 2019

(54) METHODS AND SYSTEMS FOR DETECTING UNBALANCED PAYLOAD CONDITION IN MACHINES

(71) Applicant: Caterpillar Inc., Peoria, IL (US)

(72) Inventors: Justin Lee Steinlage, Mackinaw, IL (US); Jason Bell, Dahinda, IL (US); Stefan Jacob Wulf, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 275 days.

(21) Appl. No.: 15/290,437

(22) Filed: Oct. 11, 2016

(65) Prior Publication Data
US 2018/0100779 A1 Apr. 12, 2018

(51) Int. Cl.
| | |
|---|---|
| *G01M 1/14* | (2006.01) |
| *G01M 1/12* | (2006.01) |
| *B60W 40/13* | (2012.01) |
| *G07C 5/00* | (2006.01) |

(52) U.S. Cl.
CPC .............. *G01M 1/14* (2013.01); *B60W 40/13* (2013.01); *G01M 1/122* (2013.01); *G07C 5/008* (2013.01); *B60W 2040/1315* (2013.01)

(58) Field of Classification Search
CPC ...................................................... G01M 1/14
USPC ....................................................... 73/65.01
See application file for complete search history.

(56) References Cited

U.S. PATENT DOCUMENTS

| | | | | |
|---|---|---|---|---|
| 4,635,739 A | * | 1/1987 | Foley ..................... | G01G 19/10 177/141 |
| 4,835,719 A | * | 5/1989 | Sorrells .................. | G01G 19/08 177/136 |
| 4,839,835 A | * | 6/1989 | Hagenbuch .............. | G08G 1/20 702/174 |
| 4,852,674 A | * | 8/1989 | Gudat .................... | G01G 19/10 177/141 |
| 5,391,843 A | | 2/1995 | Sato et al. | |
| 6,424,907 B1 | * | 7/2002 | Rieth .................. | B60G 17/0162 340/438 |
| 6,601,013 B2 | * | 7/2003 | Lueschow .............. | G01G 19/08 177/136 |
| 7,072,763 B2 | * | 7/2006 | Saxon .................. | G01G 19/086 177/136 |
| 7,717,664 B2 | | 5/2010 | Bitter et al. | |

(Continued)

*Primary Examiner* — Lisa M Caputo
*Assistant Examiner* — Jean F Morello
(74) *Attorney, Agent, or Firm* — Harrity & Harrity LLP

(57) ABSTRACT

A method for detecting an unbalanced payload condition in a machine is disclosed. The method includes detecting, by a first sensor, a pressure exerted on each of one or more struts in the machine by a payload. The method further includes detecting, by a second sensor, one or more operational parameters associated with machine. Furthermore, method includes determining, by a controller, a center of gravity of the payload based on detected pressure, the one or more operational parameters, and one or more dimensions of the machine. Additionally, the method includes determining, by the controller, a force being exerted, by the payload, on each traction member of the machine based on the center of gravity of the payload. The method further includes detecting, by the controller, the unbalanced payload condition when the force, being exerted on at least one traction member of the plurality of traction members, exceeds a threshold value.

20 Claims, 6 Drawing Sheets

(56) References Cited

U.S. PATENT DOCUMENTS

| | | | |
|---|---|---|---|
| 8,156,048 B2* | 4/2012 | Mintah | G01G 19/10 |
| | | | 177/136 |
| 8,386,134 B2* | 2/2013 | Morey | G01G 19/10 |
| | | | 172/430 |
| 8,417,425 B2 | 4/2013 | Fortmann | |
| 8,825,314 B2 | 9/2014 | Jensen | |
| 8,903,612 B2 | 12/2014 | Tejeda et al. | |
| 8,954,246 B2 | 2/2015 | Siegel et al. | |
| 8,966,962 B2* | 3/2015 | Kamada | B60P 1/045 |
| | | | 701/124 |
| 8,989,969 B2 | 3/2015 | Uematsu et al. | |
| 9,086,427 B2 | 7/2015 | Maeda et al. | |
| 9,221,659 B2* | 12/2015 | Fukasu | E02F 9/26 |
| 2004/0181317 A1* | 9/2004 | Flechtner | B60W 40/13 |
| | | | 701/1 |
| 2014/0067240 A1* | 3/2014 | Yu | B60W 40/13 |
| | | | 701/112 |
| 2014/0222299 A1* | 8/2014 | Stander | B60P 1/04 |
| | | | 701/50 |
| 2016/0339585 A1* | 11/2016 | Webster | B25J 9/1638 |

* cited by examiner

METHODS AND SYSTEMS FOR DETECTING UNBALANCED PAYLOAD CONDITION IN MACHINES

TECHNICAL FIELD

The present disclosure relates to a machine. More specifically, the present disclosure relates to methods and systems for detecting unbalanced payload condition in a machine.

BACKGROUND

A typical worksite, such as mining worksite and construction worksite, involve haulage of payload on machines from one location to another. A typical machine, hauling the payload, may include a dump body that may be configured to carry the payload. The dump body may be supported by various support members, such as one or more struts. Such support members may be further coupled to a plurality of traction members, such as tires. Typically, the force, exerted due to the weight of the payload, is to be distributed among the support members and the plurality traction members.

In certain scenarios, the payload may cause uneven forces to act on the support members and the plurality of traction members. For example, the force being exerted (due to the payload) on one of the traction members may exceed a permissible limit. Such uneven forces may affect certain support members and the plurality of traction members, which may affect the operation of the machine.

U.S. Pat. No. 5,391,843 (hereinafter '843) discloses an object to accurately measure a carrying weight of a vehicle based on a force applied to suspension cylinders. A first force being applied to a front wheel suspension cylinder of a vehicle carrying a load is determined based on values of pressure sensors. A second force being applied to a rear wheel suspension cylinder is determined based on detection values of pressure sensors. An inclination of the vehicle in the longitudinal direction is detected by an inclinometer. The carrying weight is determined based on the first force, the second force, and the inclination of the vehicle.

SUMMARY

According to an aspect of the present disclosure a method for detecting an unbalanced payload condition in a machine is disclosed. The method includes detecting, by a first sensor of the machine, a pressure exerted on each of one or more struts in the machine by a payload on the machine. The one or more struts are configured to support the payload. The method further includes detecting, by a second sensor of the machine, one or more operational parameters associated with the machine. The one or more operational parameters comprise an orientation of the machine. Furthermore, the method includes determining, by a controller of the machine, a center of gravity of the payload based on the pressure on each of the one or more struts, the one or more operational parameters, and one or more dimensions of the machine. Additionally, the method includes determining, by the controller, a force being exerted, by the payload, on each traction member of a plurality of traction members of the machine based on the center of gravity of the payload. The method further includes detecting, by the controller, the unbalanced payload condition when the force, being exerted on at least one traction member of the plurality of traction members, exceeds a threshold value.

According to another aspect of the present disclosure a machine is disclosed. The machine includes a plurality of traction members, and a payload carrier supported by the plurality of traction members through one or more struts. The payload carrier is configured to receive a payload. The machine further includes a first sensor configured to detect a pressure exerted on each of the one or more struts by the payload. Furthermore, the machine includes a second sensor configured to detect one or more operational parameters associated with the machine. The one or more operational parameters comprise an orientation of the machine. The machine additionally includes a controller communicatively coupled to the first sensor and the second sensor. The controller is configured to determine a center of gravity of the payload based on the pressure on each of the one or more struts, the one or more operational parameters, and one or more dimensions of the machine. The controller is further configured to determine a force being exerted on each traction member of the plurality of traction members based on the center of gravity of the payload. Additionally, the controller is further configured to detect an unbalanced payload condition when a difference, between the force being exerted on a traction member of the plurality of traction members and the force being exerted on other traction members of the plurality of traction members, exceeds a threshold value.

According to yet another aspect of the present disclosure a system for detecting an unbalanced payload condition in a machine, is disclosed. The system comprises a first sensor, installed in one or more struts in the machine, configured to detect a pressure exerted on each of the one or more struts by a payload on the machine. The one or more struts are configured to support the payload. The system further comprises a second sensor configured to detect one or more operational parameters associated with the machine. The one or more operational parameters comprise an orientation of the machine. Furthermore, the system includes a controller communicatively coupled to the first sensor and the second sensor. The controller is configured to determine a center of gravity of the payload based on the pressure on each of the one or more struts, the one or more operational parameters, and one or more dimensions of the machine. The controller is further configured to determine a force being exerted, by the payload, on each traction member of a plurality of traction members based on the center of gravity of the payload. The plurality of traction members is configured to support the payload through the one or more struts. Furthermore, the controller is configured to detect the unbalanced payload condition when the force, being exerted on at least one traction member of the plurality of traction members, exceeds a threshold value.

DETAILED DESCRIPTION

Figure 1:
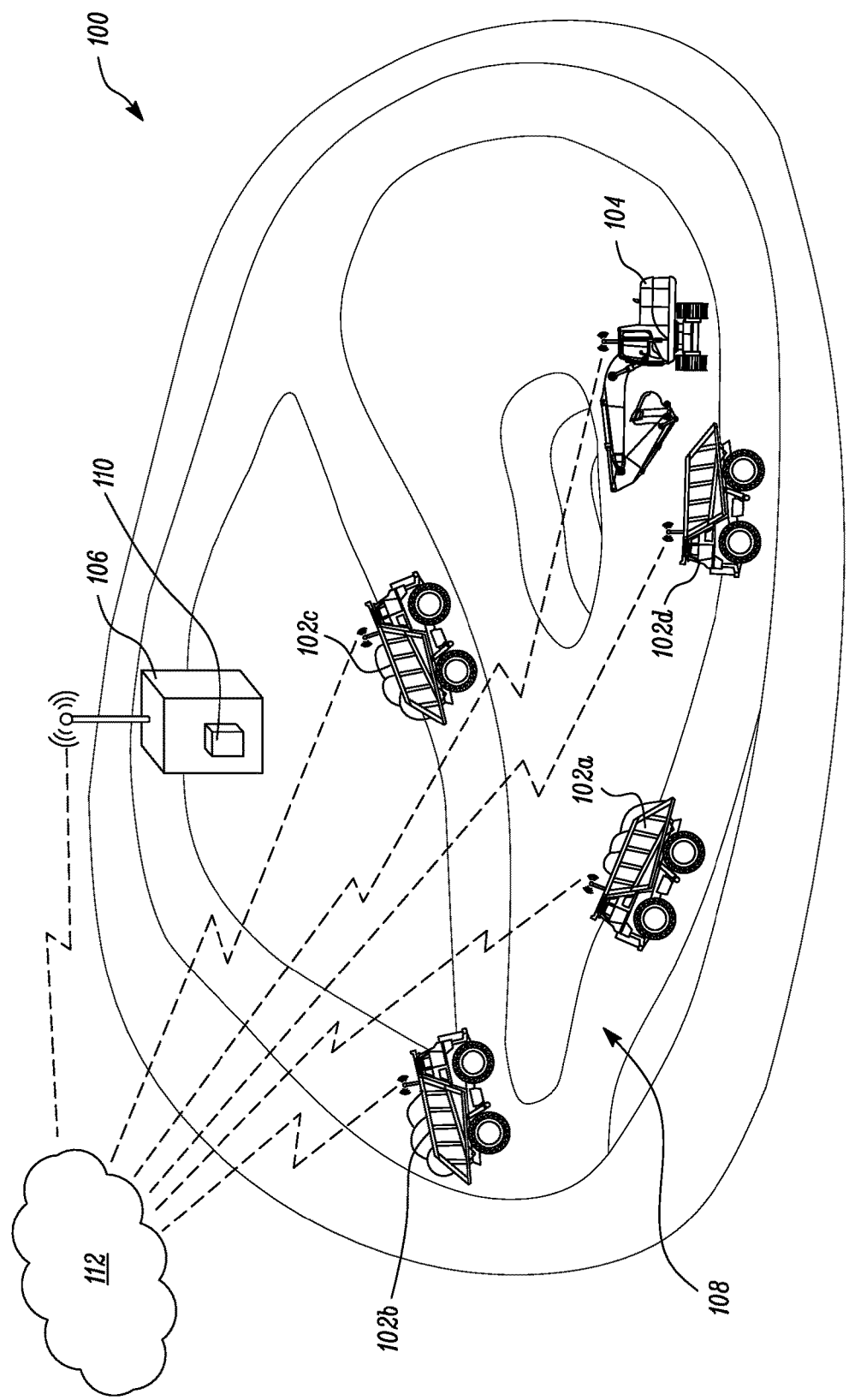
FIG. 1 illustrates an exemplary worksite, in accordance with some implementations of the present disclosure.

Referring to FIG. 1, an exemplary worksite 100 is illustrated. In some implementations, the worksite 100 may correspond to a mining site, a construction site, or any other site where a machine may be used to perform a task. The worksite 100 may include one or more first machines 102a, 102b, 102c, and 102d, a second machine 104, a remote center 106, and an operational path 108. The remote center 106 may further include an application server 110. Further, the one or more first machines 102a, 102b, 102c, and 102d, the second machine 104, the application server 110 may be communicatively coupled with each other through a network 112. For the sake of brevity, the first machine 102a has been considered for the purpose of describing the ongoing description. However, the details described herein for the first machine 102a may be applied to other first machines 102b, 102c, and 102d.

The first machine 102a may correspond to a machine that may have the capability to transport payload from one location to another. Some examples of the first machine 102a may include, but are not limited to, a dump truck, a pick-up truck, a tipper, or any other machine that may have the capability to transport the payload. In some implementations, the first machine 102a may traverse the operational path 108 to transport the payload. The operational path 108 may have one or more attributes such as, but are not limited to, a grade, and a bank angle. The first machine 102a may be operated in accordance with the one or more attributes of the operational path 108. For example, the first machine 102a may be accelerated or decelerated according to the grade of the operational path 108. In some implementations, the first machine 102a may include a system for detecting an unbalanced payload condition. In some implementations, the unbalanced payload condition may correspond to a condition where unequal forces are exerted by the payload on traction members of the first machine 102a. In another implementation, the unbalanced payload condition may correspond to a condition where the force exerted by the payload on a traction member of the first machine 102a may be greater than a threshold value. The system for detecting the unbalanced payload condition will be described below in conjunction with FIG. 2 and FIG. 3. Further, the structure and the components of the first machine 102a will be described below in conjunction with FIG. 2 and FIG. 3.

The second machine 104 may correspond to a machine that may be configured to load the payload on the first machine 102a. Some examples of the second machine 104 may include, but are not limited to, a loader machine, an excavator, a backhoe loader, and/or the like. In some implementations, the second machine 104 may include an implement that may be connected/coupled to a frame of the second machine 104 through a linkage assembly. The linkage assembly may include one or more arms that may be actuated either individually or in combination to move the implement along one or more paths to pick up and load the material on the first machine 102a as the payload.

In some implementations, the remote center 106 may correspond to a remote monitoring station that may be configured to monitor and control various machines operating in the worksite 100. For example, the remote center 106 may be configured to monitor and control the one or more first machines 102a, 102b, 102c, and 102d, and the second machine 104. In some implementations, the remote center 106 may include the application server 110 that may be configured to monitor and control the one or more first machines 102a, 102b, 102c, and 102d, and the second machine 104 by transmitting commands to the respective machines over the network 112. Further, the application server 110 may be configured to receive a notification, indicative of the unbalanced payload condition, from the one or more first machines 102a, 102b, 102c, and 102d, over the network 112. The application server 110 may be further configured to generate and maintain a historical data based on the notification. In some implementations, the historical data may comprise a plurality of notifications received from the one or more first machines 102a, 102b, 102c, and 102d over a time period. The operation of the application server 110 will be described below in conjunction with FIG. 6. Referring back to FIG. 1, the application server 110 may be realized through various types of application servers such as, but are not limited to, a Java application server, a .NET framework application server, a Base4 application server, a PHP framework application server, or any other application server framework. In some implements, the application server may implemented using hardware, software, and/or a combination of hardware and software.

In some implementations, the network 112 may correspond to a communication medium through which the first machine 102a, the second machine 104, and the application server 110, may communicate with each other. Such a communication may be performed in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The network 112 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Figure 2:
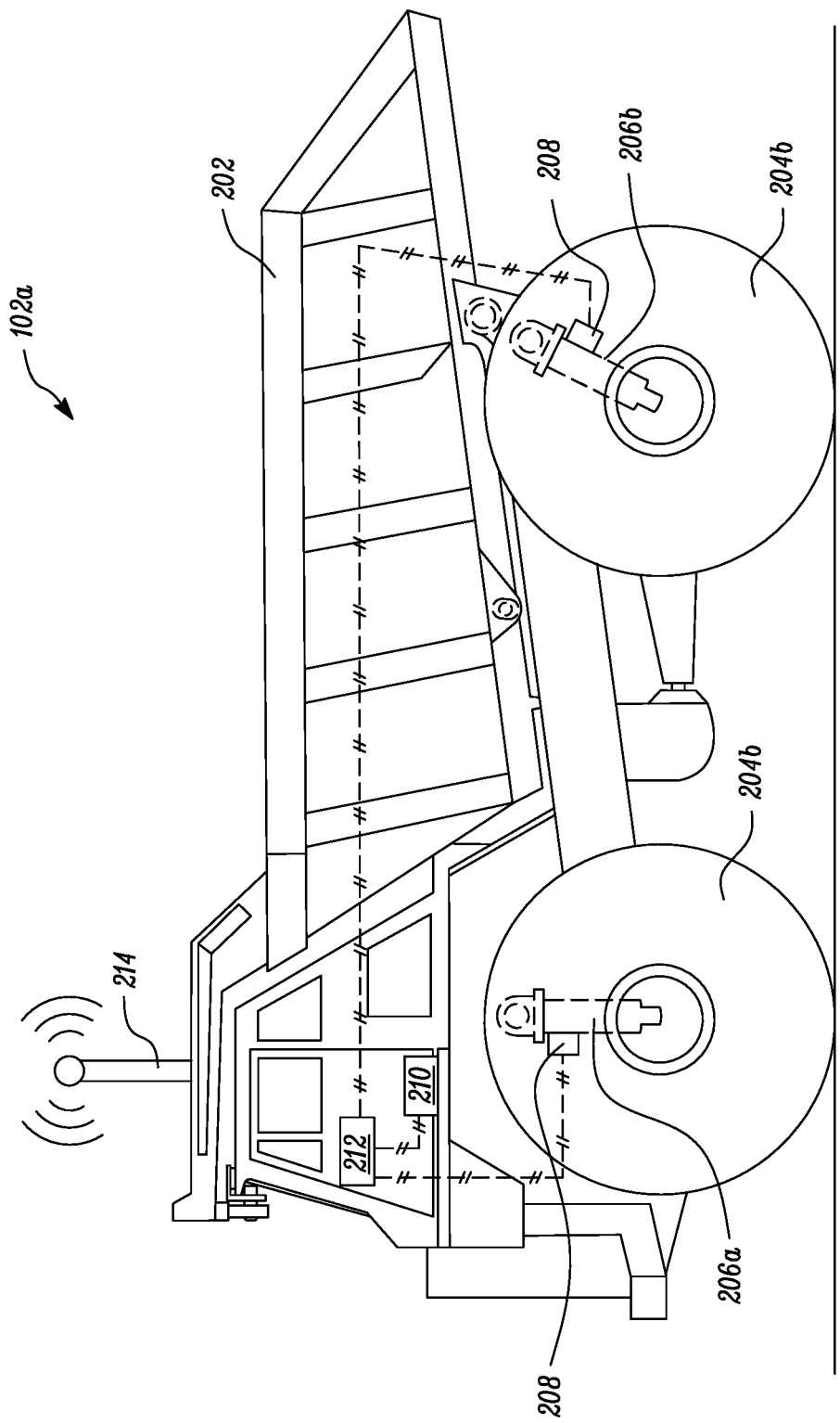
FIG. 2 illustrates a diagrammatic illustration of a side view of the machine, in accordance with some implementations of the present disclosure.
Figure 3:
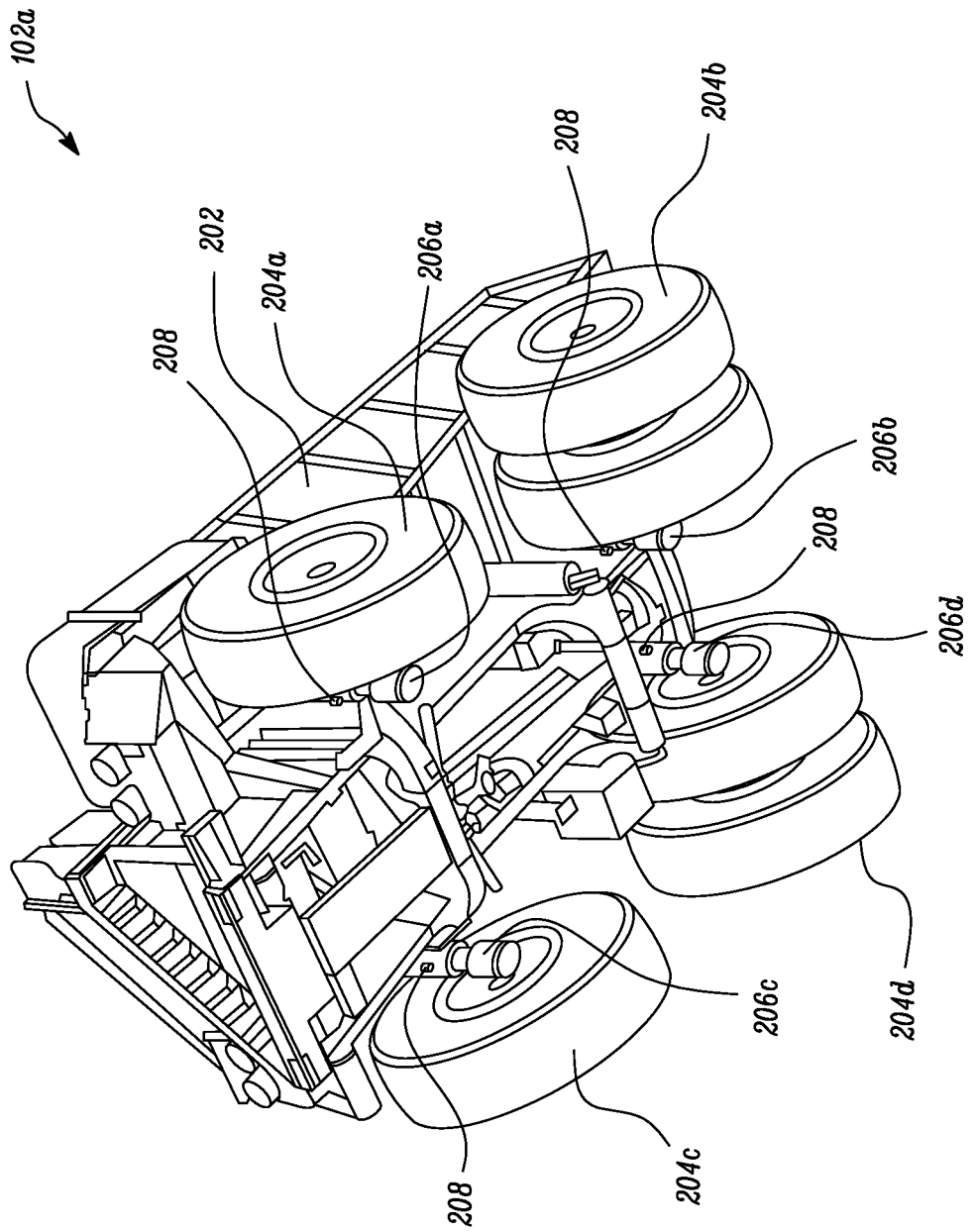
FIG. 3 illustrates a diagrammatic illustration of a bottom view of the machine, in accordance with some implementations of the present disclosure.

Different views of the first machine 102a are illustrated in FIG. 2 and FIG. 3. FIG. 2 illustrates a side view of the first machine 102a, and FIG. 3 illustrates a bottom view of the first machine 102a. The first machine 102a may include a payload carrier 202, a plurality of traction members 204a (shown in FIG. 2), 204b (shown in FIG. 2), 204c (shown in FIG. 3) and 204d (shown in FIG. 3) (hereinafter referred to as the traction members 204), and one or more struts 206a, 206b, 206c, and 206d (hereinafter referred to as the struts 206). Each of the struts 206 may be coupled to the payload carrier 202 and the respective traction member 204. For example, the strut 206a may be coupled to the traction member 204a and the payload carrier 202. Further, the first machine 102a may include a system for detecting the unbalanced payload condition. The system may include first sensors 208, a second sensor 210, a controller 212, and a transceiver 214.

The payload carrier 202 may correspond to a dump body (or a dump bed) that may be configured to receive and store the payload for the purpose of transportation of the payload. The payload carrier 202 may be supported on the traction members 204 through the struts 206. In some implementations, the payload carrier 202 may further be coupled to one or more hydraulic actuators (not shown) that may be configured to move the payload carrier 202 to at least unload the payload. In some implementations, the payload carrier 202 may be designed according to the weight carrying capability of the first machine 102a.

In some implementations, the traction members 204 may be referred to as a transport mechanism of the first machine 102a and may correspond to a plurality of tires. In some implementations, the first machine 102a may have four or more tires based on the load carrying capacity of the first machine 102a. A person having ordinary skill in the art would appreciate that the scope of the disclosure is not limited to realizing the traction members 204 as the tires. In some implementations, the traction members 204 may correspond to a set of crawler tracks, and/or a combination crawler tracks and wheel members.

The struts 206 may be configured to support the payload carrier 202. In some implementations, the struts 206 may be supportively coupled to the payload carrier 202 and the traction members 204 in such a manner that the force exerted by the payload carrier 202 may be distributed among the traction members 204. For example, the one or more struts 206a, 206b, 206c, and 206d are coupled to the plurality of traction members 204a, 204b, 204c, and 204d, respectively. In some implementations, the struts 206 may be a hydraulic strut or a pneumatic strut. From FIG. 2 it can be observed that only four struts are illustrated. However, a person having ordinary skill in the art would appreciate that first machine 102a may have more than four struts based on the load carrying capability of the first machine 102a.

The first sensor 208 may include suitable logic, circuitry, interfaces, and/or code that may enable the first sensor 208 to detect a pressure exerted on a component in the first machine 102a. For example, the first sensor 208 may be configured to detect the pressure exerted on each of the struts 206. In some implementations, the first sensor 208 may be installed in each of the one or more struts 206a, 206b, 206c, and 206d. For example, the first sensor 208 may be installed in the strut 206a. The first sensor 208 may transmit the information pertaining to the detected pressure to the controller 212. In some implementations, the information pertaining to detected pressure may include a voltage signal generated by the first sensor 208. In some implementations, the first sensor 208 may generate the voltage signal corresponding to the detected pressure. Some examples of the first sensor 208 may include, but are not limited to, a piezo-resistive strain gauge based pressure sensor, piezo-electricity based pressure sensor, capacitive pressure sensor, electromagnetic pressure sensor and/or the like.

The second sensor 210 may include suitable logic, circuitry, interfaces, and/or code that may enable the second sensor 210 to determine one or more operational parameters associated with the first machine 102a. In some implementations, the one or more operational parameters may include, but are not limited to, an orientation of the first machine 102a with respect to a default orientation of the first machine 102a, a lateral acceleration of the first machine 102a, a forward acceleration of the first machine 102a, a reverse acceleration of the first machine 102a, a speed at which the first machine 102a traverses the operational path 108, a grade of the operational path 108 that the first machine 102a traverses, and/or the location of the first machine 102a. The default orientation of the first machine 102a may correspond to an orientation of the machine when the machine is stationary on a flat ground. In some implementations, the second sensor 210 may comprise one or more sensors such as gyroscope, and accelerometer that may be configured to determine the one or more operational parameters (such as orientation and acceleration) of the first machine 102a. Further, in some implementations, the second sensor 210 may comprise a Global positioning system (GPS) sensor, and/or a Light Imaging, Detection, and Ranging (LIDAR) sensor that may be configured to determine the location of the first machine 102a and the grade of the operational path 108, respectively. In some implementations, the second sensor 210 may be configured to transmit the information pertaining to the one or more operational parameters to the controller 212.

In some implementations, the controller 212 may be communicatively coupled to the first sensor 208, and the second sensor 210. In some implementations, the controller 212 may include a processor and a memory. The processor may include suitable circuitry that may be capable of executing computer readable instructions stored in the memory to perform predetermined operation. For example, the controller 212 may be configured to execute the computer readable instructions to detect the unbalanced payload condition in the first machine 102a based on the pressure detected by the first sensor 208 and the one or more operational parameters (received from the second sensor 210). The detection of the unbalanced payload condition will be described below in conjunction with FIG. 4 and FIG. 5.

A person having ordinary skill in the art would appreciate that the scope of the disclosure may not be limited to the controller 212 detecting the unbalanced payload condition. In some implementations, the application server 110 may detect the unbalanced payload condition. Further, in such an implementation, the controller 212 may transmit the pressure information (received from the first sensor 208) and the one or more operational parameters (received from the second sensor 210) to the application server 110. Thereafter, the application server 110 may determine the unbalanced payload condition.

The transceiver 214 may comprise suitable logic, circuitry, interfaces, and/or code that may be configured to transmit the notification indicative of the unbalanced payload condition to the application server 110 through the network 112. In some implementations, where the unbalanced payload condition is detected by the application server 110, the transceiver 214 may be configured to transmit the pressure information and the one or more operational parameters to the application server 110. In some implementations, the transceiver 214 may implement one or more known technologies to support wired or wireless communication with the network 112. In some implementations, the transceiver 214 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 214 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., Institute of Electrical and Electronics Engineers (IEEE) 802.11a, IEEE 802.11b, IEEE 802.11g and/or IEEE 802.11n), voice over Internet Protocol (VoIP), Worldwide Interoperability for Microwave Access (Wi-MAX), a protocol for email, instant messaging, and/or Short Message Service (SMS).

Figure 4:
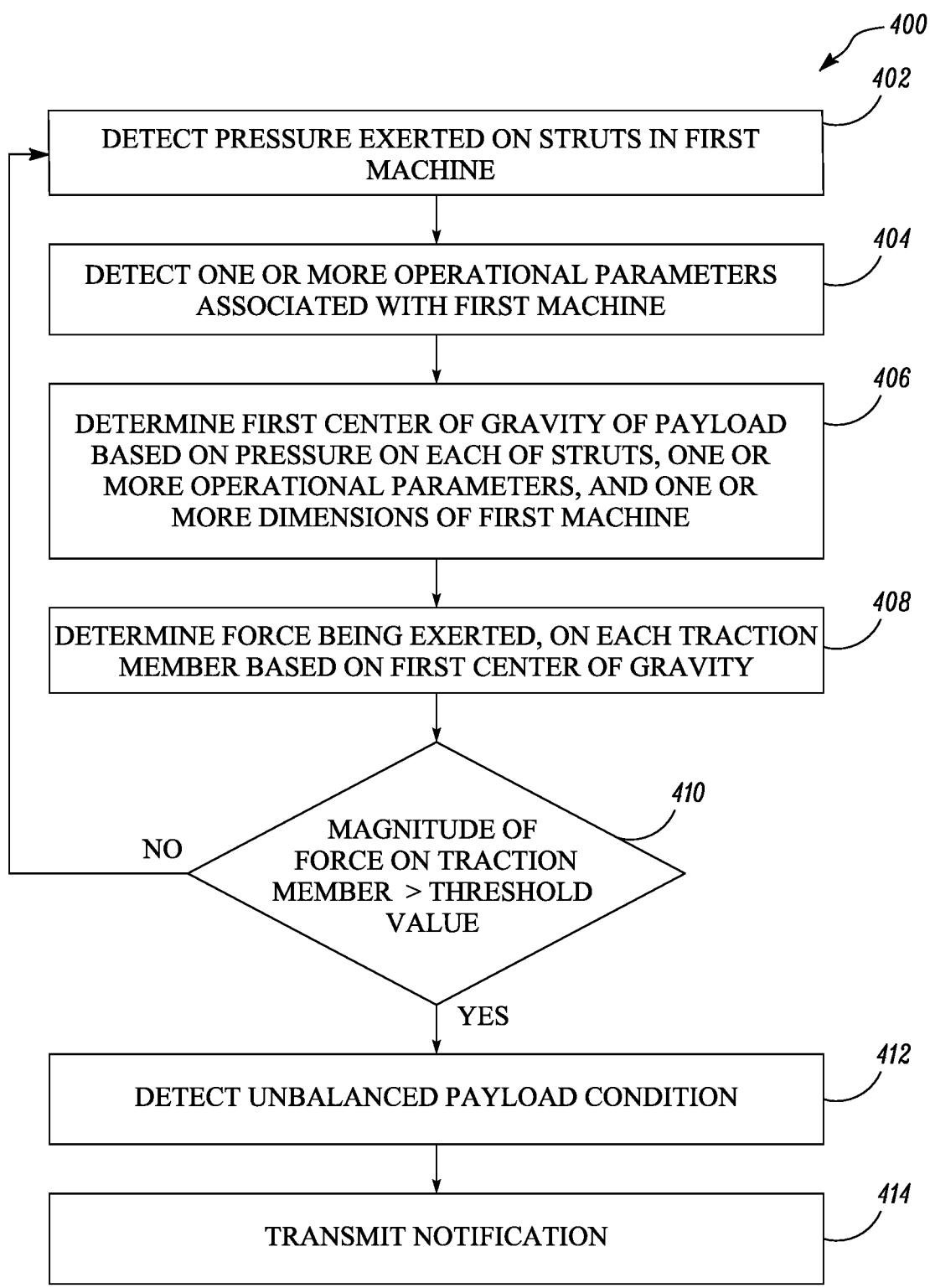
FIG. 4 illustrates a flowchart of a method for detecting the unbalanced payload condition in a machine, in accordance with some implementations of the present disclosure.

Referring to FIG. 4, a flowchart 400 is illustrated in conjunction with FIG. 1, FIG. 2, and FIG. 3.

At step 402, the pressure being exerted on each of the struts 206 may be detected. In some implementations, the first sensor 208 may be configured to detect the pressure being exerted on each of the struts 206. Prior to detecting the pressure, the second machine 104 may load the payload in the payload carrier 202. Thereafter, the first sensor 208 may detect the pressure being exerted on the struts 206. In some implementations, the first sensor 208 may generate the voltage signal corresponding to the detected pressure. Thereafter, the first sensor 208 may transmit the voltage signal.

In some implementations, the controller 212 may be configured to determine a value of the pressure exerted on each of the struts 206 based on the magnitude of the voltage signal. For example, the controller 212 may determine that the value of the pressure exerted on the strut 206a and the strut 206b is 30 N/m$^2$ and 50 N/m$^2$, respectively. A person having ordinary skill in the art would appreciate that the value of the pressure determined by the controller 212 may be indicative of a combination of the pressure exerted by the payload carrier 202 and the payload in the payload carrier 202. Therefore, the controller 212 may be configured to determine the pressure exerted only by the payload on each of the struts 206. In some implementations, the controller 212 may subtract the value of the pressure exerted on each of the struts 206 by the payload carrier 202 (hereinafter referred to as the default pressure value) from the determined pressure value. In some implementations, the controller 212 may obtain the default pressure value from the memory in the controller 212. In some implementations, the default pressure value may be determined during manufacturing of the first machine 102a. In some implementations, the first sensor 208 may be calibrated in such a manner that the pressure exerted by the payload carrier 202 may remain undetected. However, any additional pressure (other than the pressure exerted by the payload carrier 202) exerted on the struts 206 may be detected by the first sensor 208.

At step 404, the one or more operational parameters associated with the first machine 102a may be detected. In some implementations, the second sensor 210 may be configured to detect the one or more operational parameters associated with the first machine 102a. As discussed, the one or more operational parameters may comprise, but not limited to, the orientation of the first machine 102a with respect to the default orientation of the first machine 102a, the lateral acceleration of the first machine 102a, the forward acceleration of the first machine 102a, the reverse acceleration of the first machine 102a, the speed at which the first machine 102a traverses the operational path 108, the grade of the operational path 108, and/or the location of the first machine 102a. A person having ordinary skill in the art would appreciate that the one or more operational parameters may be detected when the first machine 102a is operating. For example, when the first machine 102a traverses along the operational path 108, the first machine 102a may accelerate or decelerate in order to traverse the operational path 108 with a speed. Further, in some implementations, the first machine 102a may have to make a turn while traversing the operational path 108. In such an implementation, the first machine 102a may experience lateral acceleration. The second sensor 210 may detect all such accelerations associated with the first machine 102a as the one or more operational parameters. Additionally, the second sensor 210 may detect the grade of the operational path 108 as the one or more operational parameters. To detect the grade of the operational path 108, the second sensor 210 may monitor the orientation of the first machine 102a with respect to the default orientation of the first machine 102a. Based on the deviation in the orientation of the first machine 102a from the default orientation, the second sensor 210 may determine the grade of the operational path 108. In some implementations, the second sensor 210 may include the LIDAR sensor that may detect the grade of the operational path 108 without monitoring the orientation of the first machine 102a. The second sensor 210 may transmit the one or more operational parameters to the controller 212.

At step 406, a center of gravity of the payload may be determined based on the pressure on each of the struts 206, the one or more operational parameters, and one or more dimensions of the first machine 102a. In some implementations, the controller 212 may be configured to determine the center of gravity of the payload. Hereinafter, the center of gravity will be referred to as the first center of gravity.

When the first machine 102a operates (i.e., traverses the operational path 108), the payload in the first machine 102a may experience some additional forces due to operation of the first machine 102a. For example, when the first machine 102a is moving uphill, the payload may experience a component of gravitational force depending on the grade of the uphill operational path. Such forces may cause the center of gravity of the payload to shift. Therefore, in order to accurately determine the center of gravity of the payload, the controller 212 may determine a second center of gravity based only on pressure being exerted on the struts 206. The second center of gravity may be indicative of the center of gravity of the payload when the first machine 102a is not operating or is stationary. Thereafter, the controller 212 may consider the one or more operational parameters of the first machine 102a to determine the first center of gravity based on the second center of gravity. The first center of gravity may be indicative of the center of gravity of the payload when the first machine 102a is operating (i.e., the first machine 102a is not stationary). The determination of the first center of gravity will be further described below in conjunction with FIG. 5.

Figure 5:
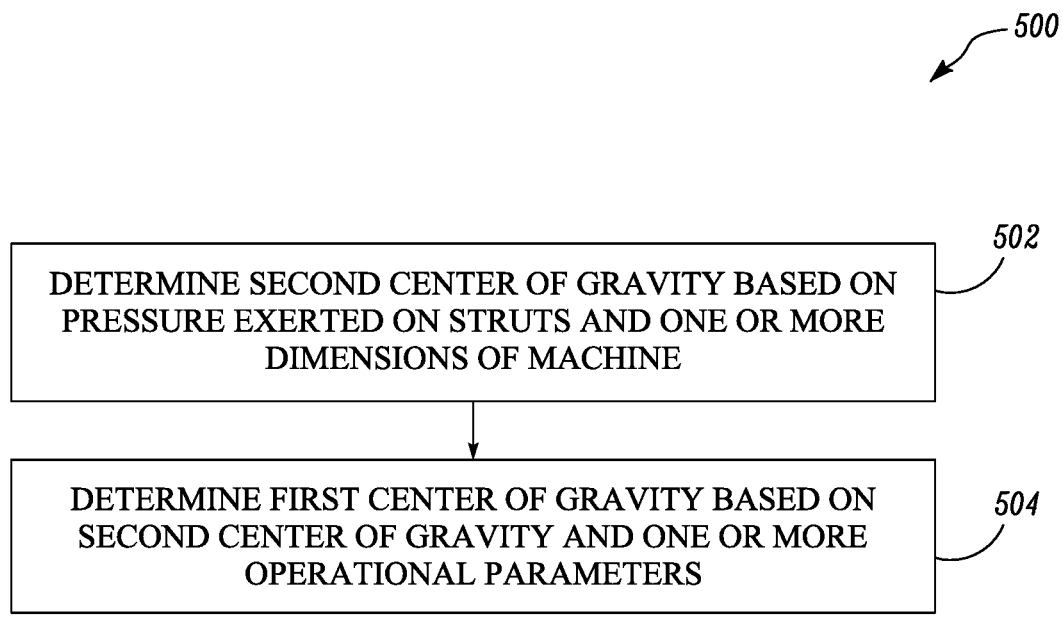
FIG. 5 illustrates a flowchart of a method for determining a center of gravity of the payload in the machine, in accordance with some implementations of the present disclosure.

Referring to FIG. 5, a flowchart 406 is illustrated. The flowchart 406 illustrates a method to determine the first center of gravity of the payload. The flowchart 406 is described in conjunction with FIG. 1, FIG. 2, FIG. 3, and FIG. 4. At step 502, the second center of gravity of the payload may be determined based on the value of the pressure exerted by the payload on each of the struts 206, and the one or more dimensions of the first machine 102a. In some implementations, the controller 212 may be configured to determine the second center of gravity of the payload. To determine the second center of gravity, the controller 212 may determine a first average pressure value based on the value of the pressure being exerted on the strut 206a and the 206b. Thereafter, the controller 212 may determine a second average pressure value based on the value of the pressure being exerted on the struts 206c and 206d (see FIG. 3). The controller 212 may be configured to determine a first coordinate of the second center of gravity based on the first average pressure value, the second average pressure value, and the one or more dimensions of the first machine 102a. In some implementations, to determine the first coordinate of the second center of gravity, the lateral dimension or the width of the first machine 102a may be considered as the one or more dimensions.

Similarly, to determine a second coordinate of the second center of gravity, the controller 212 may determine a third average pressure value based on the value of the pressure exerted on the struts 206a and 206c coupled to the front traction members 204a and 204c, respectively. Further, the controller 212 may determine a fourth average pressure value based on the value of the pressure exerted on the struts 206b and 206d coupled to the rear traction members 204b and 204d, respectively. Thereafter, the controller 212 may determine the second coordinate of the second center of gravity based on the third average pressure value, the fourth average pressure value, and the one or more dimensions of the first machine 102a. In some implementations, to determine the second coordinate of the second center of gravity, the controller 212 may utilize the longitudinal dimension (i.e., length) of the first machine 102a as the one or more dimensions. In some implementations, the first coordinate and the second coordinate constitute the second center of gravity of the payload.

At step 504, the first center of gravity may be determined based on the second center of gravity and the one or more operational parameters associated with the first machine 102a. In some implementations, the controller 212 may be configured to determine the first center of gravity based on the second center of gravity and the one or more operational parameters of the first machine 102a. As discussed that when the first machine 102a operates, the first machine 102a may accelerate in order to operate at a speed. Further, the first machine 102a may experience lateral acceleration due to a turn that first machine 102a may have made. All such accelerations may cause inertial forces (for example, centrifugal force due to lateral acceleration) to act on the payload. Additionally, the orientation of the first machine 102a may also cause inertial forces (for example gravitational force) to act on the payload. Due to such inertial forces, the pressure exerted on the struts 206 (when the first machine 102a is operating) may be different from the pressure exerted on the struts 206 (when the first machine 102a is not operating). Therefore, the second center of gravity of the payload determined at step 502 may be different from the actual center of gravity of the payload. Hence, the controller 212 may modify the second center of gravity based on the one or more operational parameters to determine the first center of gravity.

Referring back to FIG. 4, at step 408, a force being exerted on each of the traction members 204 may be determined. In some implementations, the controller 212 may be configured to determine the force being exerted on each of the traction members 204 based on the first center of gravity and the one or more dimensions of the first machine 102a. In some implementations, the controller 212 may utilize one or more known techniques to determine the force being exerted on each of the traction members 204. At step 410, a check may be performed to determine whether a magnitude of the force acting on a traction member (for example the traction member 204a) of the traction members 204, is greater than a threshold value (of a force to be exerted on the traction member). In some implementations, the controller 212 may be configured to perform the check. In some implementations, if the controller 212 determines that the magnitude of the force acting on the traction member (for example the traction member 204a) is greater than the threshold value, the controller 212, at step 412, may detect the unbalanced payload condition. Else, the controller 212 may repeat the step 402.

In some implementations, the controller 212 may detect the unbalanced payload condition when the force acting on any of the traction members 204 is greater than the threshold value. In another implementation, the controller 212 may detect the unbalanced payload condition when the force acting on a predetermined number of the traction members 204 is greater than the respective threshold value. For example, if the predetermined number of the traction members 204 is two, the controller 212 may detect the unbalanced payload condition when the force acting on any of the two traction members is greater than the threshold value.

In an alternate implementation, the controller 212 may detect the unbalanced payload condition based on a comparison of the magnitude of the forces acting on the traction members 204. For example, the controller 212 may determine a difference between the magnitude of the force acting on the traction member 204a with the magnitude of the force acting on the remaining traction members 204b, 204c, and 204d. Thereafter, controller 212 may detect the unbalanced payload condition when the determined difference exceeds a threshold value of difference. In some implementations, the difference may correspond to a difference of the force being exerted on adjacent traction members (for example 204a and 204b).

At step 414, a notification indicative of the unbalanced payload condition may be transmitted. In some implementations, the controller 212 may be configured to transmit the notification, indicative of the unbalanced payload condition, to the application server 110, the second machine 104, and an output device (not shown) in the first machine 102a (e.g., to notify an operator of the first machine 102a).

Additionally, in some implementations, the controller 212 may detect a condition of the traction members 204. To detect the condition of the traction members 204, the controller 212 may determine a value of ton kilometers per hour (TKPH) for each traction member 204 based on the force being exerted on each of the traction members 204 and the speed at which the first machine 102a is operating. In some implementations, the TKPH may correspond to a load on each traction member and may be determined based on the force being exerted in each traction member 204 and the speed of the first machine 102a. For example, if the weight of the payload on the traction member 204a is 37.5 tons and the speed of the first machine 102a is 20 km/h, the TKPH of the traction member 204a may be 750 TKPH (e.g., multiplying the weight of the payload by the speed of the machine 102a). In some implementations, the controller 212 may determine the TKPH for each traction member 204 continuously (e.g., periodically). Further, the controller 212 may compare the determined TKPH with a threshold value of the TKPH. If the controller 212 determines that the determined TKPH of at least one traction member 204 is greater than the threshold value of the TKPH, the controller 212 may generate the notification indicative of a deteriorating condition of the traction members 204.

INDUSTRIAL APPLICABILITY

Figure 6:
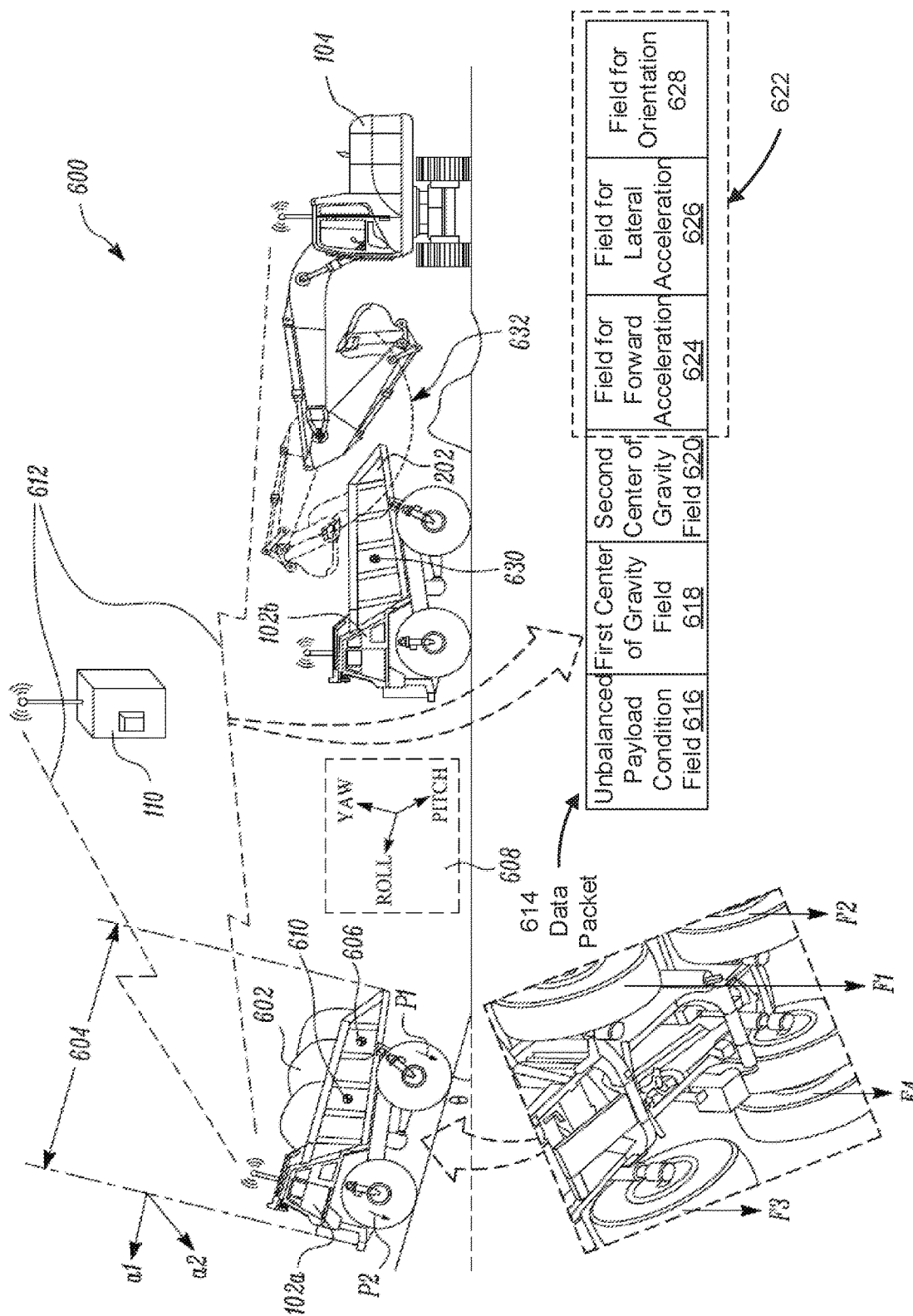
FIG. 6 illustrates an exemplary scenario to detect the unbalanced payload condition in the machine, in accordance with some implementations of the present disclosure.

Referring to FIG. 6, an exemplary scenario 600 is illustrated. The exemplary scenario 600 will be described in conjunction with FIGS. 1-5. The exemplary scenario 600 illustrates the first machine 102a, the first machine 102b, the second machine 104, and the operational path 108.

The first machine 102a carries the payload 602 and operates on the operational path 108 that has a grade 'Θ'. The controller 212 in the first machine 102a may determine the pressure being exerted on the struts 206. For example, the pressure exerted on the struts 206a and 206b is $P_1$ and $P_2$, respectively. Based on the pressure exerted on each of the struts 206 and the one or more dimensions of the first machine 102a (depicted by 604), the controller 212 determines the second center of gravity (depicted by 606).

Thereafter, the controller 212 receives the one or more operational parameters from the second sensor 210. For example, the controller 212 receives the information that the first machine 102a has a forward acceleration '$a_1$' and a lateral acceleration '$a_2$'. Further, the controller 212 receives information about the orientation of the first machine 102a. For instance, the controller 212 may receive yaw, pitch, and roll (depicted by 608) of the first machine 102a as the orientation of the first machine 102a. Based on the one or more operational parameters and the second center of gravity (depicted by 606), the controller 212 determines the first center of gravity (depicted by 610).

The controller 212 determines a force exerted on each of the traction members 204 based on the first center of gravity (depicted by 610) and the one or more dimensions (depicted by 604) of the first machine 102a. For example, the controller 212 may determine that the force being exerted on the traction members 204a, 204b, 204c, and 204d is $F_1$, $F_2$, $F_3$, and $F_4$, respectively. Further, the controller 212 determines whether the force $F_1$, the force $F_2$, the force $F_3$, and the force $F_4$ is greater than the threshold value $F_t$. If the controller 212 determines that the any of the force $F_1$, $F_2$, $F_3$, and $F_4$ is greater than the threshold value $F_t$, the controller 212 detects the unbalanced payload condition.

Based on detection of the unbalanced payload condition, the controller 212 transmits the notification (depicted by 612) to the second machine 104 and the remote center. Additionally, the controller 212 may display the notification on a display device of the first machine 102a. The operator of the first machine 102a may operate the machine according to the information displayed in the notification. In addition, the controller 212 may be configured to display the weight of the payload to the operator. In some implementations, the controller 212 may display the weight of the payload when the first machine 102a operates in the steady state condition. In some implementations, the steady state condition may correspond to a condition where a value of each of the one or more operational parameters associated with the first machine 102a is within a respective acceptable range. For example, if the value of the forward acceleration is within the predetermined range of forward acceleration, the controller 212 may determine that the first machine 102a is operating in the steady state. In some implementations, the controller 212 may determine that the first machine 102a is operating in the steady state when the first machine 102a is operating on a level grade or the first machine 102a has a smooth underfoot. Additionally, or alternatively, the controller 212 may determine that the first machine 102a is operating in the steady state when the first machine 102a has a low acceleration (for example, the acceleration of the first machine 102a is below a threshold value of the acceleration).

Thereafter, the controller 212 may determine the weight of the payload based on the second center of gravity (as described in the step 502) and the first center of gravity (as described in the step 504). However, a person having ordinary skill in the art would appreciate that the scope of the disclosure is not limited to determining the weight of the payload when the first machine 102a operates in the steady state. In some implementations, the controller 212 may determine the weight of the payload irrespective of the state of the operation of the first machine 102a.

In some implementations, the controller 212 may transmit the notification as a data packet 614. The data packet 614 may include an unbalanced payload condition field 616, a first center of gravity field 618, a second center of gravity field 620, the operational parameters field 622. The unbalanced payload field 611 may include information pertaining to the detection of the unbalanced payload condition. In some implementations, a value of '1' in an unbalanced payload condition field 616 may indicate that the unbalanced payload condition has been detected and a value of '0' in the unbalanced payload condition field 616 may indicate that no unbalanced payload condition has been detected. The first center of gravity field 618 may include information pertaining to the coordinates of the first center of gravity 610. Similarly, the second center of gravity field (depicted by 620) may include information pertaining to the coordinates of the second center of gravity (depicted by 606). The operational parameters field 622 may include the information pertaining to the one or more operational parameters of the first machine 102a. In some implementations, the operational parameters field 622 may include one or more subfields that are used to individually store the information pertaining to the one or more operational parameters. For example, the operational parameters field 622 may include a field for forward acceleration (depicted by 624), a field for lateral acceleration (depicted by 626), and a field for orientation (depicted by 628).

The second machine 104 receives the notification from the first machine 102a (depicted by 612). The second machine 104 may include a second controller that may be configured to control the operation of the second machine 104. Based on receiving the notification (depicted by 612) from the first machine 102a, the second controller may generate an alarm for the operator of the second machine 104. Further, the second controller may display the information obtained from data packet 614 corresponding to the notification to the operator (of the second machine 104) on a display device in the second machine 104. The information may assist the operator to load the payload in the first machine 102b in such a manner that the unbalanced pay condition in the first machine 102b is avoided.

In a scenario, where the second machine 104 is autonomous, the second controller may utilize the information obtained from the data packet 614 corresponding to the notification (depicted by 612) to determine a location in the dump body (depicted by 630), where the payload is to be loaded to avoid the unbalanced payload condition. In some implementations, the second controller may utilize a mathematical model (based on information in the notification) to determine the location in the dump body where the payload need to be loaded. For example, the notification (depicted by 612) includes the information that the first center of gravity (depicted by 610) of the payload is $(X_2, Y_2)$. Further, the second controller obtains the information about the one or more operational parameters of the first machine 102a from the data packet 614. Thereafter, the second controller may utilize the mathematical model to determine the location (depicted by 630) where the payload needs to be loaded in the first machine 102b. In some implementations, to further accurately determine the location (depicted by 630) in the first machine 102b (where the payload needs to be loaded), the second controller may receive the one or more operational parameters associated with the first machine 102b from the first machine 102b. As during loading operation, the first machine 102b may be stationary, the one or more operational parameters may include at least the orientation of the first machine 102b with respect to the default orientation of the first machine 102b. Based on the orientation information, the second controller may determine whether the first machine 102b is on a leveled ground. Thereafter, based on the orientation of the first machine 102b and the location (depicted by 630) determined based on the one or more operational parameters of the first machine 102a, the second controller may determine a new location where the payload is to be loaded on the first machine 102b. The new location may be determined by the second controller in such a manner that the unbalanced payload condition is avoided during the operation of the first machine 102b and during the loading of the payload in the first machine 102b. In some implementations, the controller 212 may provide information pertaining to the orientation of the first machine 102b to the operator of the first machine 102b (by means of the output device). Based on the information, the operator of the first machine 102b may re-position the first machine 102b (with respect to the second machine 104) in such a manner that when the payload is loaded on the first machine 102b, the unbalanced payload condition in the first machine 102b is avoided. In some implementations, the controller 212 may transmit the information, pertaining to the orientation of the first machine 102b, to the second controller. The second controller may provide the information to the operator of the second machine 104. Thereafter, based on the information, the operator of the second machine 104 may re-position of the second machine 104 with respect to the first machine 102b in such a manner that when the second machine 104 loads the payload on the first machine 102b, the unbalanced payload condition in the first machine 102b is avoided.

After determination of the location (depicted by 630) where the payload needs to be loaded in the payload carrier (depicted by 202), the second controller may determine one or more paths that the implement may need to traverse in order to load the payload at the determined location (depicted by 630) in the first machine 102b. For example, the implement may follow the path (depicted by 632) to load the payload the determined location in the first machine 102b. In some implementations, the path of the implement may be determined based on a geo fencing technique. In such an implementation, the determined location (depicted by 630) in the first machine 102b may be geo fenced. Further, the implement may have a Radio Frequency Identification (RFID) tag that may generate a trigger when the RFID tag is in the geo fenced area. Therefore, when the implement is in the geo fenced area around the determined location (depicted by 630), the RFID tag may transmit a trigger to the second controller. On receiving the trigger, the second controller may actuate the implement to release the payload at the determined location (depicted by 630).

In some implementations, the implement of the second machine 104 may be geo fenced instead of geo-fencing the determined location on the first machine 102b. In such a scenario the first machine 102b may have the RFID tag. When the first machine 102b is in the geo fenced area defined for the implement of the second machine 104, the RFID tag may generate a trigger signal. The trigger signal may be transmitted to the second controller in the second machine 104. Thereafter, the second controller in the second machine 104 may actuate the implement to load the payload on the first machine 102b.

Additionally, in some implementations during loading of the payload in the first machine 102b, the controller 212 may, in real time, transmit the information pertaining to the center of gravity of the payload in the first machine 102b to the second controller. The controller 212 may employ similar methodologies, as explained in the step 406, to determine the center of gravity of the payload. Based on the received information pertaining to the center of gravity of the payload, the second controller may display information pertaining to the location (depicted by 630) where the payload has been loaded, to the operator of the second machine 104. The operator may determine whether the payload has been loaded at the correct location in the first machine 102b.

In some implementations, the controller 212 may transmit the notification (depicted by 612) to the application server 110. The application server 110 on receiving the notification may generate a historical data. In some implementations, the application server 110 may update the historical data, if the historical data has been previously generated. In some implementations, the historical data corresponds to a repository of the notifications received from multiple machines (e.g., the first machines 102a, and 102b) over a period of time. Based on the historical data, the application server 110 may generate the mathematical model that is utilized to train the second machine 104. As discussed, the second machine 104 may utilize the mathematical model to determine the location (depicted by 630) where the payload needs to be loaded to avoid the unbalanced payload condition.

In some implementations, based on detection of the unbalanced payload condition, the controller 212 may actuate the hydraulic actuators coupled to the payload carrier 202. The hydraulic actuators may reorient the payload carrier 202 in such a manner that the center of gravity may shift. The shifted center of gravity redistributes the forces acting on the traction members 204 and therefore, unbalanced payload condition is avoided.

some implementations additionally, or alternatively, based on detection of the unbalanced payload condition, the controller 212 may reduce the speed at which the first machine 102a is operating. Additionally, or alternatively, based on detection of the unbalanced payload condition, the controller 212 may activate the output device to present the unbalanced payload condition to the operator of the first machine 102a.

The disclosed implementations encompass numerous advantages. As the center of gravity of the payload is determined when the first machine is operating, therefore, the determination of the center of gravity is accurate. Accurate determination of the center of gravity leads to accurate detection of the unbalanced payload condition. Further, as the factors that led to the detection of the unbalanced payload are recorded and is utilized by the application server to train the second machine, the second machine is able to load the payload in such a manner that the unbalanced payload condition is avoided. Further, when the unbalanced payload condition is detected, the speed of operation of the first machine is reduced. Therefore, accidental situations that may occur due to unbalanced payload condition are avoided.

While aspects of the present disclosure have been particularly shown and described with reference to some implementations above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for detecting an unbalanced payload condition in a machine, the method comprising:

detecting, by a first sensor of the machine, a pressure exerted on each of one or more struts in the machine by a payload on the machine,
   wherein the one or more struts are configured to support the payload;
detecting, by a second sensor of the machine, one or more operational parameters associated with the machine,
   wherein the one or more operational parameters comprise an orientation of the machine;
determining, by a controller of the machine, a center of gravity of the payload based on the pressure exerted on each of the one or more struts, the one or more operational parameters, and one or more dimensions of the machine;
determining, by the controller, a force being exerted, by the payload, on each traction member of a plurality of traction members of the machine based on the center of gravity of the payload; and
detecting, by the controller, the unbalanced payload condition when the force, being exerted on at least one traction member of the plurality of traction members, exceeds a threshold value,
   wherein the machine is operated or loaded based on detecting the unbalanced payload condition.

2. The method of claim 1,
wherein the center of gravity is a first center of gravity,
wherein the method further comprises:
   determining, by the controller, a second center of gravity of the payload based on the pressure exerted on each of the one or more struts and the one or more dimensions of the machine, and
   wherein the first center of gravity is determined based on the second center of gravity and the one or more operational parameters.

3. The method of claim 1, wherein the one or more operational parameters further comprise at least one of:
   a lateral acceleration of the machine,
   a forward acceleration of the machine,
   a reverse acceleration of the machine,
   a speed of the machine,
   a grade of an operational path of the machine, or
   a location of the machine.

4. The method of claim 1, further comprising:
modifying, by the controller, a speed of the machine based on detecting the unbalanced payload condition.

5. The method of claim 1, further comprising:
transmitting, by the controller, a notification indicative of the unbalanced payload condition to an operator of the machine.

6. The method of claim 5, wherein the notification comprises information pertaining to at least one of the center of gravity of the payload or the one or more operational parameters.

7. The method of claim 1,
wherein the machine is a first machine,
wherein the method further comprises:
   transmitting a notification, indicative of the unbalanced payload condition, to a second machine that is configured to load the payload, and
   wherein the second machine is configured to load the payload on another machine such that the unbalanced payload condition is avoided.

8. The method of claim 1, further comprising:
transmitting a notification, indicative of the unbalanced payload condition, to an application server,
   wherein the application server updates historical data based on the notification, and
   wherein the historical data comprises information regarding a plurality of notifications received from other machines over a time period.

9. The method of claim 8,
wherein the machine is a first machine,
wherein a second machine, configured to load the payload, is trained based on the historical data to load the payload such that the unbalanced payload condition is avoided, and
wherein the second machine is an autonomous machine.

10. A machine comprising: a plurality of traction members;
   a payload carrier supported by the plurality of traction members through one or more struts,
      wherein the payload carrier is configured to receive a payload;
   a first sensor configured to detect a pressure exerted on each of the one or more struts by the payload;
   a second sensor configured to detect one or more operational parameters associated with the machine,
      wherein the one or more operational parameters comprise an orientation of the machine; and
   a controller, communicatively coupled to the first sensor and the second sensor, configured to:
      determine a center of gravity of the payload based on the pressure exerted on each of the one or more struts, the one or more operational parameters, and one or more dimensions of the machine, determine a force being exerted on each traction member, of the plurality of traction members, based on the center of gravity of the payload, and
      detect an unbalanced payload condition when the force, being exerted on at least one traction member of the plurality of traction members, exceeds a threshold value, wherein the machine is operated or loaded based on detecting the unbalanced payload condition.

11. The machine of claim 10, further comprising:
an output device configured to provide a notification to an operator of the machine,
   wherein the notification is indicative of the unbalanced payload condition.

12. The machine of claim 10,
wherein the controller is further configured to:
   transmit a notification, indicative of the unbalanced payload condition, to a loader machine that is configured to load the payload, and
wherein the loader machine is configured to load the payload on another machine, based on the notification, such that the unbalanced payload condition in the other machine is avoided.

13. The machine of claim 10,
wherein the controller is further configured to:
   transmit a notification, indicative of the unbalanced payload condition, to an application server,
wherein the application server updates historical data based on the notification, and
wherein the historical data comprises information regarding a plurality of notifications received from other machines over a time period.

14. The machine of claim 13, wherein a loader machine is trained, based on the historical data, to load payload such that the unbalanced payload condition is avoided.

15. The machine of claim 10, wherein the controller is further configured to:
modify a speed of the machine based on detecting the unbalanced payload condition.

16. The machine of claim 10,
wherein the center of gravity is a first center of gravity, and
wherein the controller is further configured to:
determine a second center of gravity of the payload based on the pressure exerted on each of the one or more struts and the one or more dimensions of the machine.

17. The machine of claim 16, wherein, when determining the center of gravity, the controller is configured to:
determine the first center of gravity based on the second center of gravity and the one or more operational parameters.

18. A system for detecting an unbalanced payload condition in a machine, the system comprises:
one or more sensors configured to:
detect a pressure exerted on one or more struts by a payload on the machine, and
detect one or more operational parameters associated with the machine; and
a controller, communicatively coupled to the one or more sensors, configured to:
determine a center of gravity of the payload based on the pressure exerted on the one or more struts and the one or more operational parameters,
determine a force being exerted, by the payload, on each traction member of a plurality of traction members based on the center of gravity of the payload,
wherein the plurality of traction members are configured to support the payload through the one or more struts, and
detect the unbalanced payload condition when the force, being exerted on at least one traction member of the plurality of traction members, satisfies a threshold value,
wherein the machine is operated or loaded based on detecting the unbalanced payload condition.

19. The system of claim 18, wherein the one or more operational parameters further comprise:
an orientation of the machine,
a lateral acceleration of the machine,
a forward acceleration of the machine,
a reverse acceleration of the machine,
a speed of the machine,
a grade of an operational path of the machine, and
a location of the machine.

20. The system of claim 18,
wherein the center of gravity is a first center of gravity,
wherein the controller is further configured to:
determine a second center of gravity of the payload based on the pressure exerted the one or more struts and one or more dimensions of the machine, and
wherein, when determining the center of gravity, the controller is configured to:
determine the first center of gravity based on the second center of gravity and the one or more operational parameters.

* * * * *